United States Patent
Gratza

(10) Patent No.: US 9,119,377 B2
(45) Date of Patent: Sep. 1, 2015

(54) PET TOY CONTAINING A TREAT COMPARTMENT

(71) Applicant: Renee Gratza, Kingman, AZ (US)

(72) Inventor: Renee Gratza, Kingman, AZ (US)

(*) Notice: Subject to any disclaimer, the term of this patent is extended or adjusted under 35 U.S.C. 154(b) by 0 days.

(21) Appl. No.: 14/463,997

(22) Filed: Aug. 20, 2014

(65) Prior Publication Data

US 2015/0053143 A1 Feb. 26, 2015

Related U.S. Application Data

(60) Provisional application No. 61/868,014, filed on Aug. 20, 2013.

(51) Int. Cl.
*A01K 15/02* (2006.01)
*A01K 11/00* (2006.01)

(52) U.S. Cl.
CPC ............. *A01K 15/026* (2013.01); *A01K 15/025* (2013.01)

(58) Field of Classification Search
CPC ... A01K 15/025; A01K 15/026; A63H 33/18; A63H 13/02; A63H 33/00; A63H 33/004; A63H 37/00; A63H 3/12; A63H 3/36
USPC ......... 119/709, 702, 707, 708, 710, 711, 174; 446/321
See application file for complete search history.

(56) References Cited

U.S. PATENT DOCUMENTS

| | | | | |
|---|---|---|---|---|
| 4,657,253 A | * | 4/1987 | Lerner et al. | 473/576 |
| 5,228,690 A | * | 7/1993 | Rudell et al. | 473/573 |
| 5,265,559 A | * | 11/1993 | Borell | 119/707 |
| 5,391,106 A | * | 2/1995 | Lidert, Jr. | 446/337 |
| 5,398,928 A | * | 3/1995 | Rudell et al. | 473/575 |
| 5,467,981 A | * | 11/1995 | Rudell et al. | 473/571 |
| 5,551,687 A | * | 9/1996 | Krull | 473/573 |
| 5,649,848 A | * | 7/1997 | Clark | 446/321 |
| 5,965,182 A | | 10/1999 | Lindgren | |
| 6,083,128 A | * | 7/2000 | Young et al. | 473/576 |
| 6,328,157 B1 | * | 12/2001 | Tolver | 206/216 |
| 6,427,634 B1 | | 8/2002 | Mann | |
| 6,470,830 B2 | | 10/2002 | Mann | |
| 6,695,666 B2 | * | 2/2004 | Nikonorov | 446/46 |
| 6,726,572 B1 | * | 4/2004 | Versen | 472/54 |
| 6,840,197 B1 | * | 1/2005 | Trompke | 119/711 |
| 6,983,722 B2 | | 1/2006 | Tepper et al. | |
| 7,100,539 B2 | * | 9/2006 | Levan | 119/707 |
| D583,421 S | * | 12/2008 | Slinker | D21/398 |
| 7,762,214 B2 | * | 7/2010 | Ritchey | 119/707 |
| D658,817 S | | 5/2012 | Costello et al. | |
| 8,240,273 B2 | | 8/2012 | Benson | |

(Continued)

*Primary Examiner* — Yvonne Abbott-Lewis
(74) *Attorney, Agent, or Firm* — Schmeiser, Olsen & Watts LLP

(57) ABSTRACT

A hollow pet toy containing an interior compartment is described. The toy's interior compartment is accessed through an opening in the exterior fabric of the toy. The purpose of the interior compartment is to hide a treat, examples of which may be a smaller toy or a food-treat. The interior compartment may also contain stuffing in the form of fabric strips, flags, or sleeves, which, in some examples of the invention, are fixed at one end to the interior compartment but which may otherwise be removed from the interior compartment by the pet seeking to discover the treat. Some examples of the invention feature an additional "treat compartment" within the fabric strips, flags, sleeves, or other stuffing of the interior compartment. A treat is placed in one or more of these "treat compartments" for the pet to discover and enjoy.

17 Claims, 6 Drawing Sheets

(56) References Cited

U.S. PATENT DOCUMENTS

| | | |
|---|---|---|
| 8,789,496 B2 | 7/2014 | Axelrod et al. |
| D714,868 S * | 10/2014 | Nash .............................. D19/86 |
| 2007/0234969 A1 | 10/2007 | Lynch |
| 2009/0255482 A1 | 10/2009 | Santarsiero |
| 2009/0272326 A1 | 11/2009 | Bacon |
| 2010/0147229 A1 | 6/2010 | DeFazio |
| 2011/0259282 A1 | 10/2011 | Tsengas et al. |
| 2013/0061815 A1 | 3/2013 | Mobrem |
| 2013/0087104 A1 | 4/2013 | Williams et al. |
| 2013/0167779 A1 | 7/2013 | Axelrod et al. |
| 2014/0209038 A1 | 7/2014 | Simon |
| 2014/0216357 A1 | 8/2014 | Wechsler |

* cited by examiner

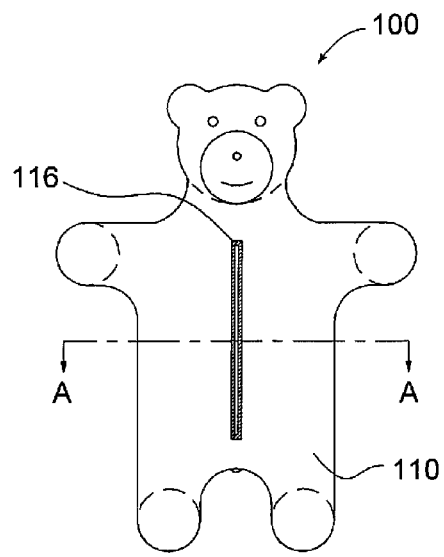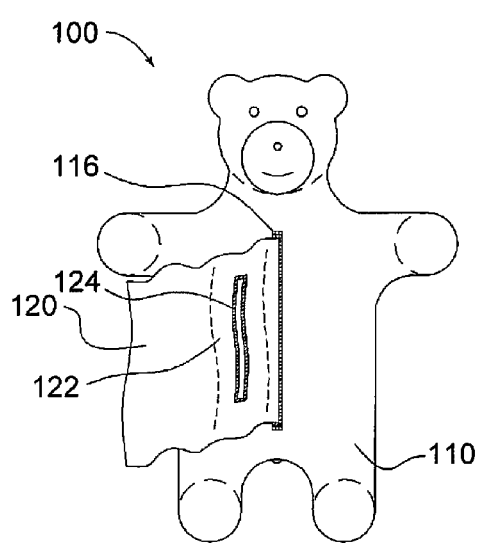
FIG. 2(a)   FIG. 2(b)
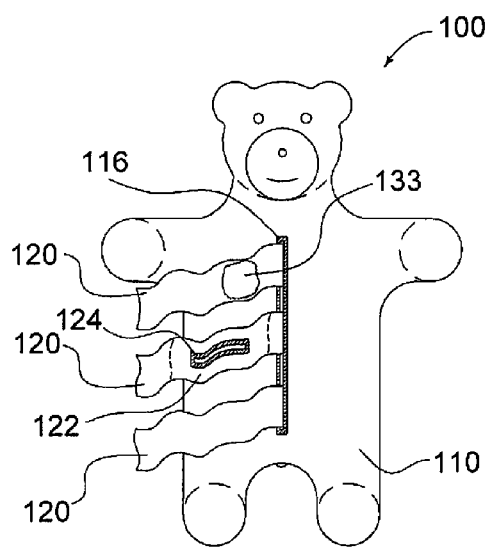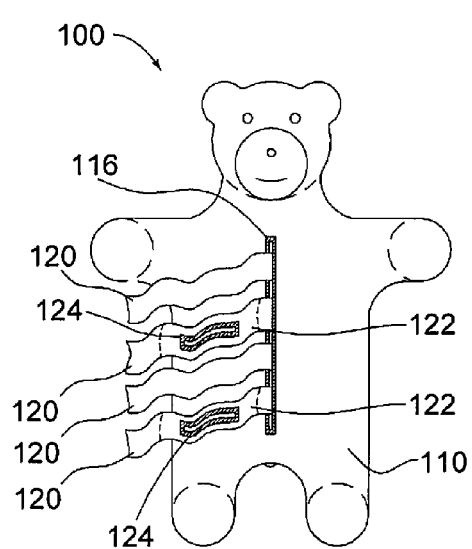
FIG. 2(c)   FIG. 2(d)

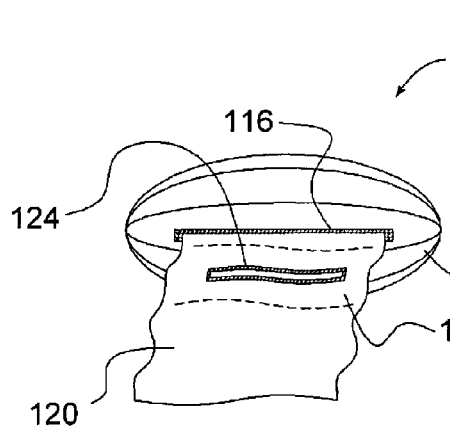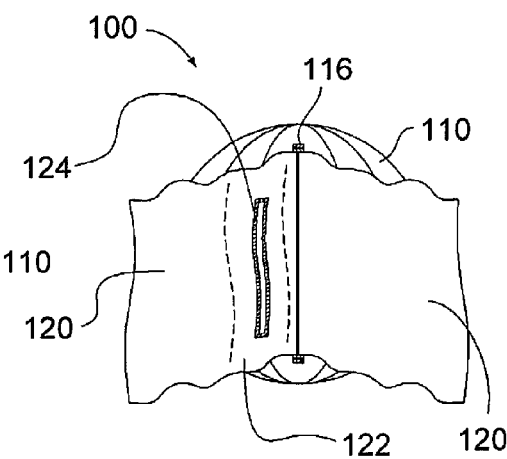
FIG. 6(a)  FIG. 6(b)
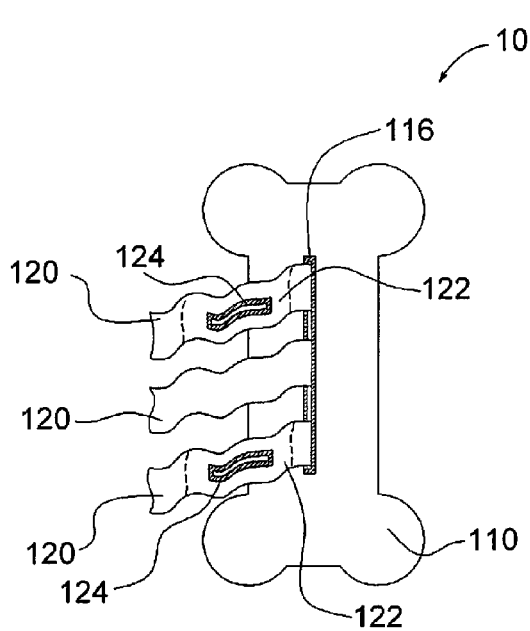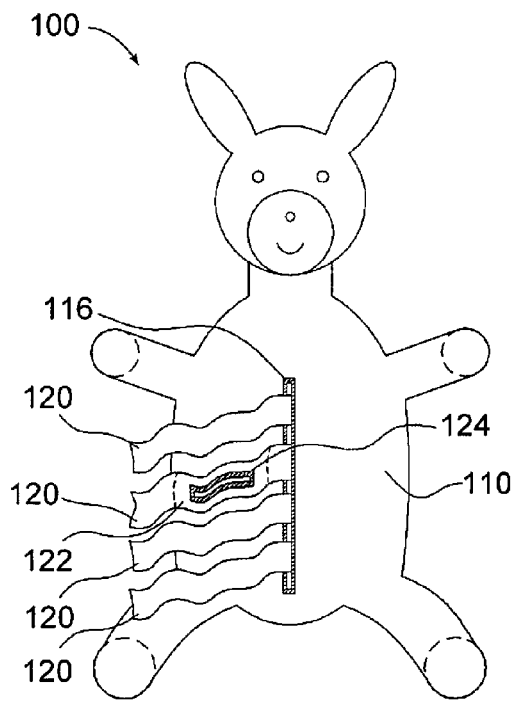
FIG. 6(c)  FIG. 6(d)

PET TOY CONTAINING A TREAT COMPARTMENT

CROSS REFERENCE TO RELATED APPLICATION

This application claims priority to U.S. Provisional Patent Application to Renee Gratza entitled "PET TOY CONTAINING TREAT COMPARTMENTS," Ser. No. 61/868,014, filed Aug. 20, 2013, the disclosures of which are hereby incorporated entirely herein by reference.

BACKGROUND OF THE INVENTION

1. Technical Field

The present invention relates generally to toys for household and other pets and, in particular, to toys containing an elongate "flag" bearing a compartment for holding a pet treat or other pet-desirable item.

2. State of the Art

Stuffed fabric toys in the form of animals, bones, balls, and other shapes have been popular toys that pet owners purchase for their pets' play and entertainment. Pets, particularly dogs and cats, appear to enjoy discovering what is inside the toy. It is commonly observed that dogs and cats enjoy chewing or tearing toys and, where possible, tearing open the body of a stuffed toy and removing stuffing from the inside. This activity, although entertaining to the pet, destroys the toy and makes a mess. Envision the pet owner returning home to find her entire house or yard strewn with pieces of shredded fabric and stuffing material requiring time-consuming, tedious cleanup.

Recently, stuffed toys have been created with durable tear-proof fabrics, such as Kevlar. This prevents destruction of the toy, along with the accompanying mess. A curious pet, no matter how persistent, however, cannot discover what is inside a Kevlar toy. Thus, the pet's enjoyment of the toy is reduced by this limitation. Additionally, such toys often require the pet owner or other person use the toy to play with the pet, which cannot be done if the pet owner, family member, etc. is working or otherwise not available.

DISCLOSURE OF THE INVENTION

The present invention relates to toys for household pets and, in particular, to toys that have one or more compartments for holding a pet treat or other pet-desirable item.

Disclosed is a pet toy containing a treat compartment. The pet toy according to embodiments of the invention includes a pet toy body, which may be soft, stuffed and chewable, and a body opening to an inner compartment containing a flag bearing a pet treat, such as an edible treat or a smaller toy. Some embodiments of the invention include a pet toy comprising a body; a body opening in the body; a first compartment, wherein the first compartment is coupled to the body opening and wherein the first compartment is accessed through the body opening; and a flag, wherein the flag is coupled to the first compartment.

In some embodiments, the flag further comprises a treat pocket; and a treat delivery opening. In some embodiments, the pet toy further comprises a treat coupled to the flag. In still more embodiments, the flag is inelastic. Some embodiments of the invention further comprise a second compartment bounded by the body and the first compartment; and a second stuffing contained within the second compartment. In some embodiments, the flag forms a first stuffing largely removable from the first compartment. In some embodiments, the pet toy further comprises a treat coupled to the flag. In some embodiments, the treat comprises any single item or any combination of items from the group of a pet comestible, a rawhide chew, a plastic chew, a rubber chew, a smaller tor, a squeaky toy, a pheromone-enhanced toy, a pet medication, a pet vitamin, and a pet nutritional supplement. In some of these embodiments, the treat is irremovably contained within the treat pocket. In some embodiments, the pet toy resembles a teddy bear.

Disclosed is a method of use of a pet toy containing a treat compartment comprising removing a flag with a treat compartment from a first compartment; selecting a treat; loading the treat into the treat pocket; replacing the flag into the first compartment; and providing the pet toy to a pet.

In some embodiments, the method further comprises retrieving the pet toy from the pet; participating in play with the pet by throwing the pet toy and allowing the pet to fetch the pet toy; or playing tug-of-war with the pet using the pet toy.

Disclosed it a pet toy comprising a body; a body opening in the body; a first compartment coupled to the body opening, wherein the first compartment is accessed through the body opening; a second compartment, wherein the first compartment is surrounded by the second compartment; a flag, wherein the flag is coupled to the first compartment; and a second stuffing, wherein the second stuffing is contained within the second compartment.

In some embodiments, the first compartment is coupled to the body at a point separate from the body opening. In some embodiments, the flag further comprises a treat pocket; and a treat delivery opening. In other embodiments, the pet toy further comprises a treat coupled to the flag. In still other embodiments, the flag is inelastic. In some embodiments, the flag further comprises a treat pocket; and a treat, wherein the treat is irremovably contained within the treat pocket. In some embodiments, the pet toy resembles a teddy bear, a bunny rabbit, a bone, a spherical ball, an ovoid ball, a football or any shape.

Disclosed is pet toy comprising a body; a body opening in the body; and a flag, wherein the flag is coupled to the body. In some embodiments, the flag further comprises a treat pocket and a treat delivery opening. In some other embodiments, the toy further comprises a treat coupled to the treat pocket.

The foregoing and other features and advantages of the present invention will be apparent to those of ordinary skill in the art from the following more particular description of the invention and its embodiments, and as illustrated in the accompanying drawing figures.

BRIEF DESCRIPTION OF THE DRAWINGS

FIG. 2(a) if a front view of a pet toy containing a treat compartment.

FIG. 2(b) is a front view of an embodiment of the invention with a flag extending from a body opening.

FIG. 2(c) is a front view of an embodiment of the invention with a plurality of flags of different forms extending from a body opening.

FIG. 2(d) is a front view of an additional embodiment of the invention with a plurality of flags of different forms extending from a body opening.

FIG. 6(a) is a perspective view, according to the invention.

FIG. 6(b) is a side view of an embodiment, wherein the body is shaped like a spheroid ball and two flags extending from the opening.

FIG. 6(c) is a front view of an embodiment with a plurality of flags, wherein the body is shaped like a bone.

FIG. 6(d) is a front view of an embodiment with a plurality of flags, wherein the body is shaped like a bunny rabbit.

DETAILED DESCRIPTION OF EMBODIMENTS OF THE INVENTION

Figure 1A:
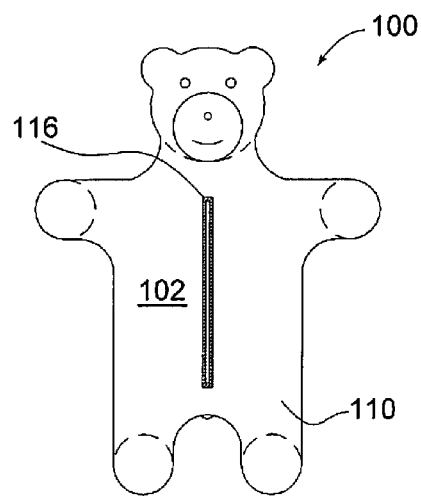
FIG. 1(a) is a front view of a pet toy containing a treat compartment, wherein the pet toy is shaped like a teddy bear.
Figure 1B:
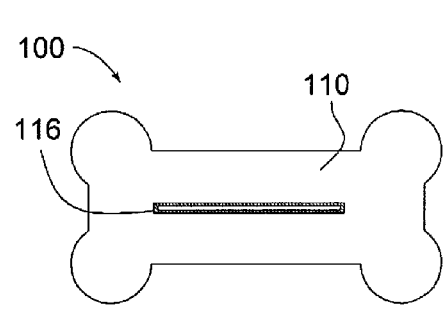
FIG. 1(b) is a front view of an embodiment of the invention wherein the pet toy is shaped like a bone.
Figure 1C:
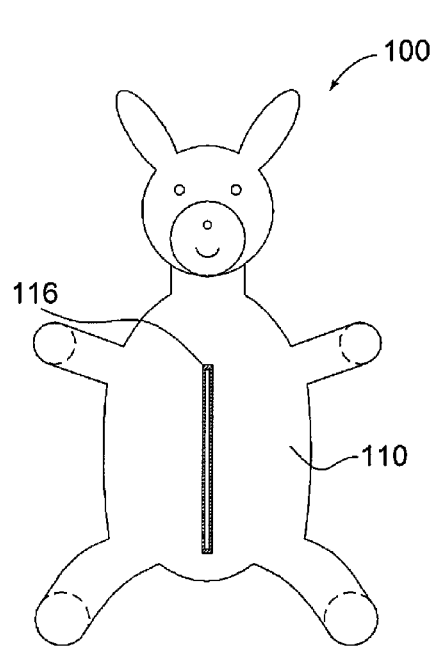
FIG. 1(c) is a front view of an embodiment of the invention wherein the pet toy is shaped like a bunny rabbit.
Figure 1D:
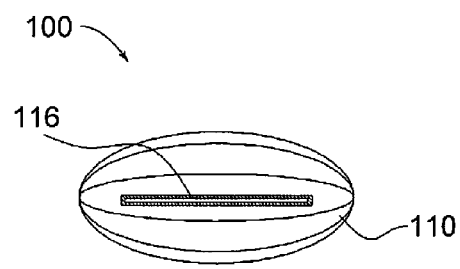
FIG. 1(d) is a front view of an embodiment of the invention wherein the pet toy is shaped like an ellipsoid ball.
Figure 1E:
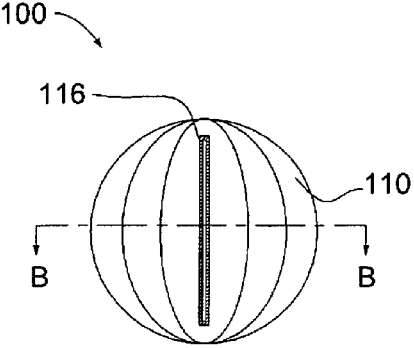
FIG. 1(e) is a front view of an embodiment of the invention wherein the pet toy is shaped like a spheroid ball.

As discussed above, embodiments of the present invention relate to toys for household and other pets and, in particular, to toys that having an elongate "flag" bearing one or more compartments for holding a pet treat or other pet-desirable item.

Disclosed is a pet toy, comprising a body, an opening in the body creating access to an attached inner compartment, and a flag attached to the material of the inner compartment. The inner compartment is an integrated compartment that includes a unique treat delivery system wherein, in some embodiments, the treat is secured within an elongate length of material resembling a flag or streamer. This flag or streamer is attached to the inside of the inner compartment and is accessible through an opening in the toy body. The treat, in some embodiments, is securely attached to or contained within the flag hidden within the inner compartment. The pet has to remove the hidden flag bearing the treat from within the inner compartment and then has to figure out how to remove the treat from the flag.

Pets, and particularly household pets like dogs and cats, enjoy playing with toys designed to engage and entertain pets. Such toys provide intellectual and physical stimulation for the pet, either with or without human participation in the activity. This is useful when the pet is necessarily left alone, such as when the owner and her family are away at work, school, or otherwise engaged in activities which do not involve the pet and are not in the pet's presence. Playing with pet toys relaxes the pet, relieves anxiety created by the absence of its owner, and is generally a mental-health-promoting activity for the pet.

The more interesting and complicated the pet toy, the greater degree of stimulation and interest the toy creates for the pet. Examples of simple pet toys include chew-toys and "squeaky" toys. Because of their simple nature, however, these typical pet-toy examples often capture the interest of the pet for only a limited time. Some toys create limited additional interest by employing treats, such as food, contained within the hollow body of the toy through a Velcro-sealed or otherwise reversibly closed external opening in the toy. Removal of food through these openings is generally straightforward for the pet, however, and creates only limited additional interest which ends when the food is discovered and consumed. The pet's interest in the toy can be further extended through human participation in the play, such as engaging in a tug-of-war activity with the pet using the toy, teasing the pet with the toy, throwing the toy for the pet to "fetch," et cetera.

Although human-pet interaction is beneficial, for a myriad of reasons, a human is not always available when the pet wants to play. In the absence of human participation, the pet will eventually get bored and decide to take play to the next level by attempting to deconstruct the toy and see what's inside. Dogs and cats generally enjoy chewing and tearing apart toys, removing any stuffing from openings they create in the body of the toy. Therefore, a problem that most pet owners face with stuffed pet toys is the destruction of the toy and the consequent mess created when the pet distributes dozens, hundreds, or thousands of pieces of the destroyed toy's body and stuffing throughout the house, the garage, and/or the yard. Some newer pet toys contain hollow interiors with openings into which are placed smaller secondary toys that the pet can enjoy "discovering." These secondary toys, however, easily become lost or "hidden" by the pet, creating expenditure of the pet owner's time and energy to find. Any resultant mess notwithstanding, however, playing with a toy to remove stuffing, treats, or secondary smaller toys from the hollow body of primary toy engages a pet and is entertaining to watch.

What is needed, therefore, is a pet toy which is more "complicated" for the pet, allows the pet to remove "stuffing" without creating a mess, contains components which are integrated and which cannot be scattered by the pet and lost, and which is resistant to destruction from tearing and chewing.

Embodiments of the present invention are designed to fulfill a pet's natural curiosity to "discover" the "insides" of a toy. This may include pulling out the stuffing without destroying the toy, and enjoying a hidden treat found inside the toy. Such a treat may be a comestible "pet treat," a chew, a small secondary toy, a noisemaker "squeaky toy," or other similar object to provide the pet with entertainment. Accordingly, the present invention is a pet toy with a hidden compartment configured to deliver treats while the pet plays with the toy, and having an integral treat delivery system hidden within the compartment of the toy. The treat delivery system consists of one or more lengths of fabric similar to a flag in design. The flag may contain a compartment within the body of the flag which, in turn, may retain a treat therein. The treat-bearing flag is hidden from the pet inside an inner storage compartment of the toy. The hidden flag can be accessed by a pet through an opening in the toy body by pulling out the flag through the opening. The flag is attached to the toy in a manner to prevent its separation from the toy. The treat may be a food product and/or additional smaller toy. The body may have the general appearance of a stuffed toy, and the inner compartment conceals a redundant length of flag "stuffing," which, in turn, contains a hidden treat that the pet must discover through prolonged playing with the toy.

Figure 3A:
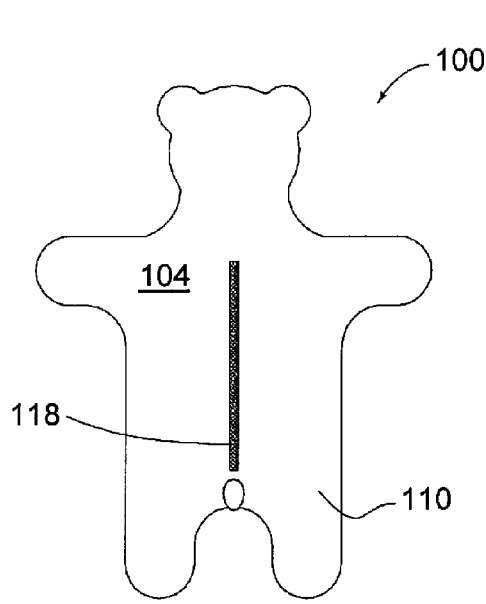
FIG. 3(a) is a rear view of an embodiment of the invention.
Figure 3B:
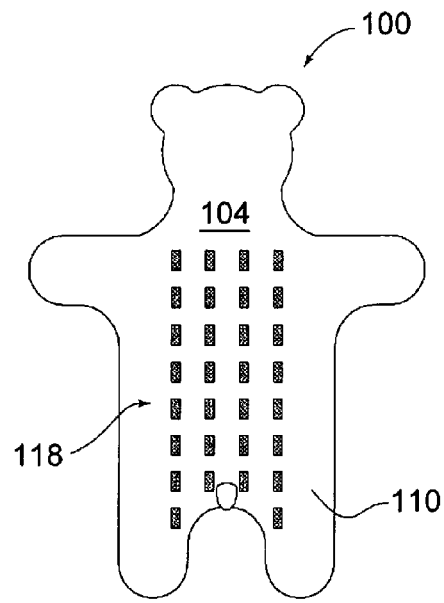
FIG. 3(b) is a rear view of a different embodiment of the invention.

FIGS. 1(a)-1(e) show a pet toy 100 with a body 110. Body 110 projects the exterior appearance and appeal of toy 100, and contains all other components of toy 100 within. Because body 110 must be resistant to a pet's chewing and tearing, in preferred embodiments, body 110 is constructed of a highly durable material, such as Kevlar fiber cloth for example. Other embodiments may employ other fabrics, such as, but not limited to, material woven from other synthetics, heavy canvas cloth, leather, or the like. Any commercially available fabric with pliable, durable, and tear-proof characteristics may be used. There is no need, however, for the material of body 110 to be flexible, rigid, or elastomeric. Although some embodiments use a durable soft cloth-like material, other embodiments designed to promote pet dental hygiene through prolonged chewing use rigid plastic and similar polymeric materials, or hard rubber. Body 110 may be a generally hollow structure to contain all of the various components of the invention. Body 110 comprises a first compartment 114. In some embodiments, body 110 is crafted by those skilled in the art to resemble traditional stuffed toys, such as a teddy bear, bunny rabbit, chew-bone, or ball as shown in the embodiments depicted by FIGS. 1(a-e). These depictions are not meant to be limiting, but rather are provided for the exemplary purposes of this disclosure. Accordingly, body 110 may be formed in the shape of other animals, toys, effigies, objects, creatures, and the like. FIGS. 1(a-c) show a front surface 102 on body 110. Correspondingly, these and some other embodiments also have a rear surface 104 on body 110 as shown in FIG. 3(a) and FIG. 3(b). Some other embodiments, like those where body 110 exhibits a degree of rotational symmetry such as those shown in FIG. 1(d) and FIG. 1(e), for example, do not have front surface 102 or rear surface 104.

FIGS. 1 (a-e) also show body opening 116. Body opening 116 provides a means for the pet to access a flag 120, which forms a first stuffing 112 and may further contain a treat 133 coupled to body 110 of flag 120, without shredding or tearing body 110 and consequently destroying toy 100. Because treat 133 is coupled to flag 120 and further contained within a treat pocket 122, there is no need to control the size of body opening 116 by the use of a drawstring or other gathering device, elastic, Velcro, incorporation of a semi-rigid deformable or elastomeric material in the construction of body 110, or other means to adjust or regulate the size of body opening 116.

Accordingly, body opening 116 need not be sealed. In some embodiments, body opening 116 is reinforced by any method available, depending on the type of fabric or other material used for body 110 and first compartment 111. Examples of reinforcement may include, without limitation, sewing, hemming, fusion, or gluing with additional material to prevent fabric from tearing around body opening 116. Body opening 116 can be of any length sufficient to accommodate the passage of treat(s) or flag(s) 120 forming first stuffing 112 through body opening 116. In some embodiments, body 110 contains a single body opening 116, as shown in FIGS. 1(a-e). In other embodiments, body 110 further comprises a plurality of body openings 116 (not shown), each body opening 116 providing access to a flag bearing a hidden treat. FIGS. 1(a-c) show body opening 116 on front surface 102. While body opening 116 is shown on front surface 102 in the drawing figures, the present invention is in no way limited to locating the body opening 116 on front surface 102. It will be understood that body opening 116 may be located on any surface of body 110.

Figure 2E:
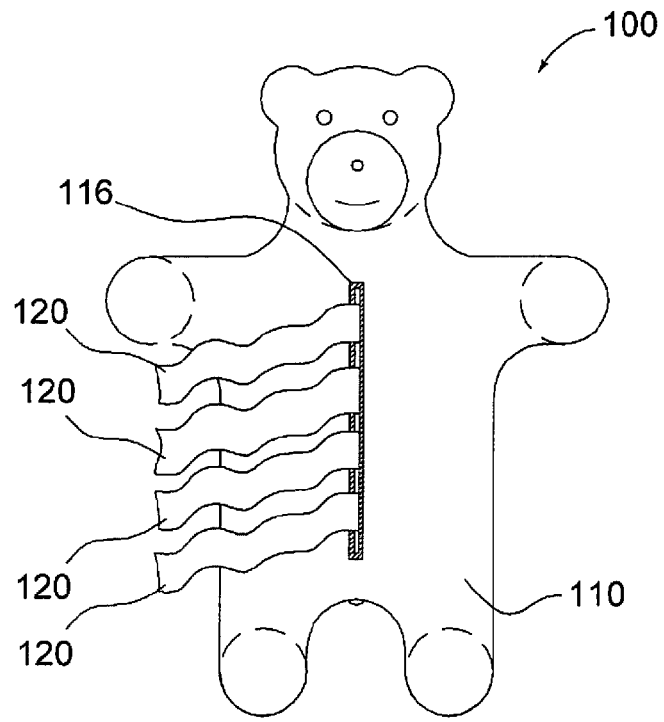
FIG. 2(e) is a front view of an embodiment of the invention with a plurality of flags of similar form extending from a body opening.

FIGS. 2(b-d) show embodiments of the invention with a flag 120 coupled to first compartment 111 (shown in FIGS. 4(a-b)). Flag 120 may take several alternate forms depending on the embodiment of the invention, such as single or multiple layers of fabric constructed as strands, strips, flags, or sleeves. A sleeve is a tube of fabric similar in construction to a human shirt sleeve and which may have an opening or pocket to hold a treat or treats. Flag 120 is made from a length of material similar to a flag or streamer and is attached to first compartment 111. Methods of attachment of flag 120 to first compartment 111 include simple or reinforced stitching, gluing, annealing, or other similarly suitable commercial means depending on the physical and chemical properties of the materials employed in construction of body 110 and inner compartment 111.

Figure 2F:
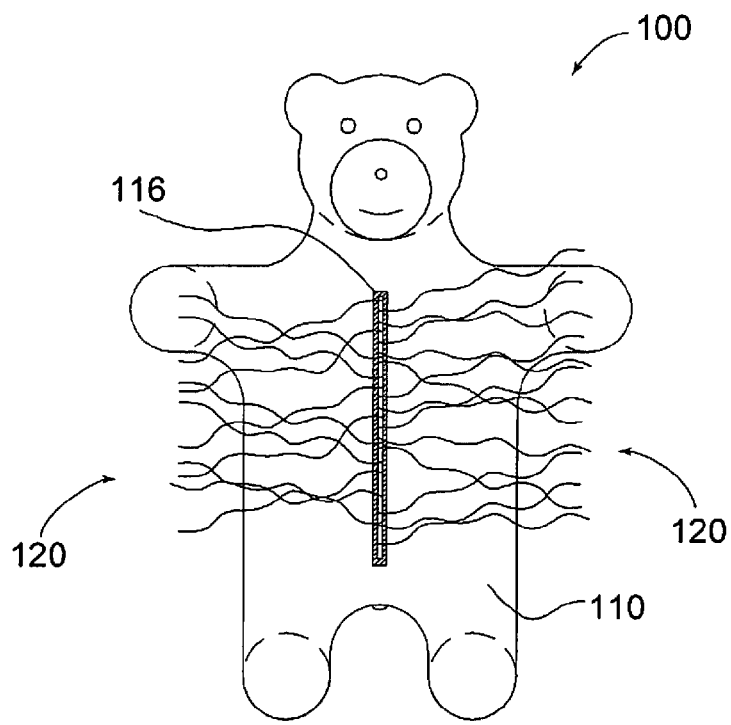
FIG. 2(f) is a front view of an embodiment of the invention with a plurality of streamers extending from a body opening.

Flag 120 may take many forms, depending upon the embodiment of the invention. In the embodiment shown by FIG. 2(b), flag 120 is in the shape of a flag. In the embodiment shown by FIG. 2(c) and FIG. 2(d), flag 120 is in the shape of a streamer. The streamer shape of flag 120 facilitates the use of multiple flags 120 with first compartment 111. FIG. 2(f) shows a plurality of flags in the form of strands. In still other embodiments, additional shapes of flag 120 are possible so long as it is an elongate material that can extend from body opening 116. It is not necessary for flag 120 to be constructed of elastomeric material. Many embodiments of the invention use durable non-elastomeric tear-resistant material, such as, but not limited to Kevlar fabric, or other ballistic material. The point of attachment of flag 120 may be to body 110 and/or first compartment(s) 114. Various locations of the attachment point of flag 120 relative to body opening(s) 116 are used. Some of these embodiments are discussed further below.

Figures 4A, 4B:
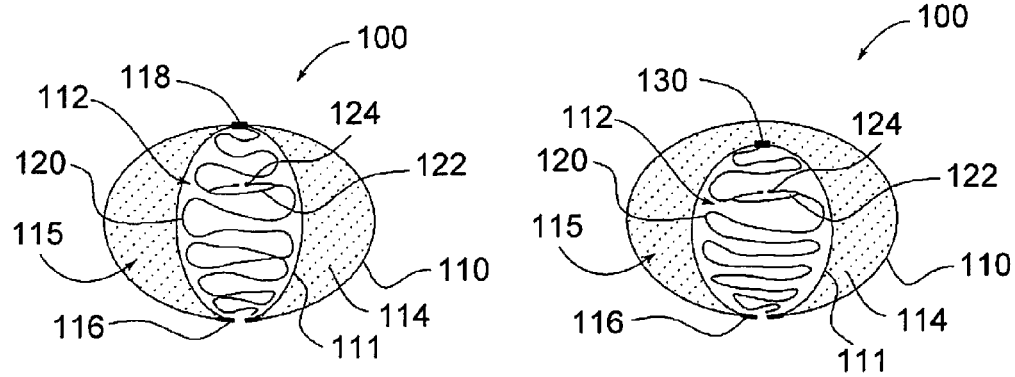
FIG. 4(a) is a cross sectional view, according to the invention.
FIG. 4(b) is a cross sectional view of an additional embodiment of the invention.
Figure 5:
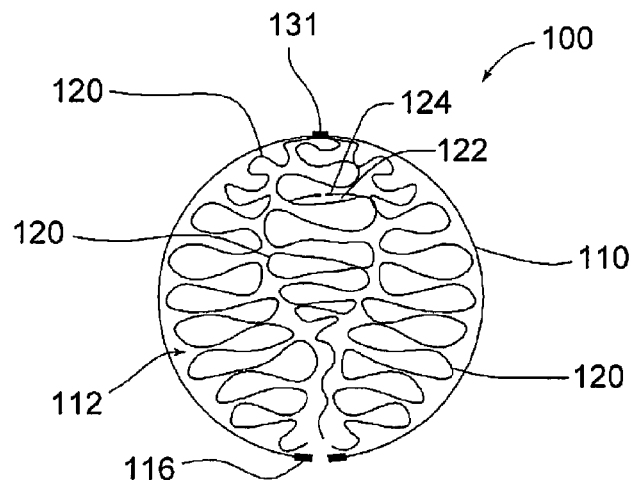
FIG. 5 is a cross sectional view of an additional embodiment of the invention.

In some embodiments, flag(s) 120 are elongate with a considerable redundant length extensively folded within first compartment 111. The mass created by the redundant length of folded flag(s) 120 comprises the first stuffing 112 of toy 100. In some embodiments, first stuffing 112 is the entire stuffing of toy 100. In some other embodiments, toy 100 comprises first compartment 111 and a second compartment 114 (discussed below). Flag(s) 120 form(s) first stuffing 112, filling first compartment 111. FIGS. 1(a-e), FIG. 2(c), FIGS. 4(a-b) and FIG. 5 show embodiments of toy 100 where flag(s) 120 are in a storage/stuffing configuration and fully contained within body 110 or first compartment 111—which when present in an embodiment is, itself, contained within body 110. FIGS. 2(b-f) and FIGS. 6(a-d) show flag(s) 120 partially removed from body 110/first compartment 111 and traversing body opening 116.

Flag 120 is a component of a treat delivery system. The treat delivery system comprises flag 120, a treat delivery opening 124 and a treat 133. Treats 133 coupled to flags 120 are initially hidden from the pet within body 110 or first compartment 111 and are subsequently delivered by the pet as the pet plays with toy 100 through either of two general ways, depending on the embodiment of the invention.

In embodiments employing the first delivery method, treat pocket 122 in flag 120 does not contain a treat delivery opening 124. Rather, treat 133 (not shown in these figures), which may be a small noisemaker or "squeaky toy," for example, is permanently sewn into a closed pocket of fabric—treat pocket 122—within flag 120. Flag 120 with coupled treat 133 is inserted through body opening 116 into first compartment 111, fully concealing flag 120 and treat 133 within first compartment 111.

In various embodiments of the invention, treat 133 is a toy smaller than body 110, a noise maker ("squeaky toy"), a pet comestible, or any other suitable object desirable to and providing entertainment for the pet. In some embodiments, treat 133 may be treated with pet pheromone, such as Adaptil Dog Appeasing Pheromone ("D.A.P.") for example. Treat 133 may also be a pet medication, vitamin, or supplement. The pet, sensing the presence of treat 133 within first compartment 111, must figure out how to retrieve treat 133 from attached flag 120 from within first compartment 111 through body opening 116. In some embodiments, treat 133 is permanently attached to flag 120 as discussed previously in a manner to prevent the full removal of treat 133 from flag 120. In these embodiments of the invention, the pet retrieves treat 133 through body opening 116 by pulling on attached flag 120.

In embodiments employing the second delivery method, flag 120 further comprises a treat delivery opening 124 providing the pet access to treat delivery pocket 122. Examples of such embodiments are shown in FIGS. 2(b-d), FIGS. 4(a-b), FIG. 5, and FIGS. 6(a-d). In these embodiments, treat 133 need not be permanently attached to flag 120. Rather, treat 133 is hidden within treat pocket 122 inside flag 120—which may be configured as a partially hollow sleeve. This configuration is useful when treat 133 is a pet comestible, such as food or a rawhide chew, or a smaller, removable secondary toy which the pet, once retrieving treat 133, may disengage from toy 100 to consume the comestible or enjoy the smaller toy. A single flag 120 may have one or a plurality of treat delivery openings 124 and treat pockets 122, depending on the embodiment of the invention. In these embodiments, the pet, having retrieved a segment of flag 120 containing treat pocket 122 and treat delivery opening 124 from body 110 of first compartment 111 through body opening 116, must additionally figure out how to remove treat 133 from inside treat pocket 122 through treat delivery opening 124. This additional step creates a further intellectual challenge for the pet and provides an opportunity for increased entertainment duration and overall pet enjoyment. Otherwise, as mentioned above, treat 133 is either fixedly or removably attached to flag 120. The location and means of attachment discussed in these various embodiments is not meant to be limiting.

Embodiments of the invention may include various ways for attaching flag 120 to body 110. FIG. 4(a) is a cross-section of toy 100 taken along line A-A of FIG. 2(a) and shows a first way for attaching flag 120 to body 110. In the embodiment of the invention shown by FIG. 4(a), first compartment 111 and flag 120 share a common point of attachment—a first point of attachment 118—to rear surface 104 of body 110. A redundant length of flag 120 is folded within first compartment 111 and forms first stuffing 112. Redundant flag 120 can be removed through body opening 116, however, first compartment 111 cannot be removed from body 110 through body opening 116 because it permanently fixed within body 110 by first point of attachment 118, as illustrated by the embodiment shown in FIG. 4(a).

FIG. 4(b) shows the second manner of attaching flag 120 to body 110. Although FIG. 4(b), like FIG. 4(a), shows a cross-section of toy 100 taken along line A-A of FIG. 2(a), FIG. 4(b) shows a different embodiment than FIG. 4(a). In the FIG. 4(b) embodiment, flag 120 is coupled to first compartment 111 at a second point of attachment 130 that does not include attachment to body 110. Redundant flag 120 is again folded within first compartment 111 forming first stuffing 115, however unlike the embodiment shown in FIG. 4(a), the FIG. 4(b) embodiment allows the pet to fully remove not only flag 120 but also first compartment 111 through body opening 116. In these embodiments, inner compartment 111 is similar in design and construction to a pocket typically found in men's trousers. This may create additional opportunities to engage the pet by incorporating an additional structure—first compartment 111—which the pet may remove through body opening 116.

FIG. 5 shows a third way of attachment of flag 120 to toy 100, in embodiments without first compartment 111. FIG. 5 shows a cross-section of toy 100 taken along line A-A of FIG. 1(e). In this and some other embodiments, flag 120 is coupled to body 110 at a third point of attachment 131. Similar to the other embodiments discussed, redundant folded flag 120 forms first stuffing 112, however in embodiments of the invention shown by FIG. 5, there is no second compartment 114 or second stuffing 115. In these embodiments, second compartment 114 and second stuffing 115 are absent and first stuffing 112 composed of the folded, redundant material of flag(s) 120 forms the sole stuffing of toy 100. Although FIG. 5 shows third point of attachment 131 located at a point on body 110 generally opposite from body opening 116, this is not meant to be limiting. Third point of attachment 131, in some other embodiments, is located at any other location of body 110 relative to body opening 116. Some embodiments of the invention feature third point of attachment 131 located at the margin of, or in close proximity to, body opening 116.

Additionally, FIG. 4(a) shows second compartment 114 bounded by body 110 and first compartment 111, and containing second stuffing 115. Second stuffing 115 is made from soft, non-toxic commercially available stuffing material, some examples of which include polyester "wool" and Dacron Hollofil by Dupont. In these embodiments, second compartment 114 is filled with second stuffing 115 and closed during manufacture and assembly of toy 100. Second compartment 114 is not accessible to the pet through body opening 116, or via other features of embodiments possessing second compartment 114. Various other embodiments of the invention do not have second compartment 114, an example of which is shown in FIG. 5 and has been discussed above.

Figure 3C:
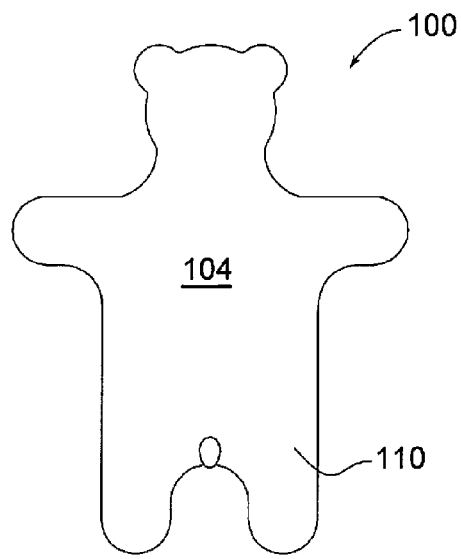
FIG. 3(c) is a rear view of a pet toy containing a treat compartment.

FIGS. 3(a-c) show a rear view of embodiments of the invention having rear surface 104. FIG. 3(a) and FIG. 3(c) additionally show multiple rear attachment methods wherein flag(s) 120 are attached to body 110 via either first point of attachment 118, third point of attachment 131, or any combination including at least one either first point of attachment 118 or third point of attachment 131. First point of attachment 118 and third point of attachment 131 both involve body 110 and are apparent on rear surface 104, however first point of attachment 118 and third point of attachment 131 have a similar or identical appearance on rear surface 104 and cannot be distinguished from one another in this view. In other embodiments, first point of attachment 118 and/or third point of attachment 131 are located on other locations of body 110 and are not visible on rear surface 104. First point of attachment 118 and/or third point of attachment 131, depending on the embodiment, are at the rear surface 104 of body 110. As shown in FIG. 3(a), first point of attachment 118 or third point of attachment 131 is elongated, such as would be used for a wider flag 120. Conversely, embodiments using a plurality of flags 120, such as streamer-shaped flags 120 for example, may utilize a plurality first point(s) of attachment 118 and/or third point(s) of attachment 131 as shown in FIG. 3(b). Alternatively, FIG. 3(c) shows rear surface 104 of toy 100 in an embodiment wherein flag(s) 120 are coupled to first compartment 111 at second point(s) of attachment 130. As shown by FIG. 3(c), second point of attachment is not visible on rear surface 104.

As mentioned earlier, different embodiments of the invention may feature one flag 120 or a plurality of flags 120. In embodiments containing a plurality of flags 120, there may be a corresponding plurality of first points of attachment 118, second points of attachment 130, or third points of attachment 131. In some embodiments, one or more second points of attachment 130 may exist on first compartment 111 along with one first point of attachment 118. Some embodiments, an example of which is shown in FIG. 3(b), may have a plurality of first points of attachment 118, wherein a corresponding plurality of flags 120 are fixed to both first compartment 111 and body 110 forming first stuffing 112, along with second compartment 114 and second stuffing 115 also being present in these embodiments.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A pet toy comprising:
   a body;
   a body opening in the body; and
   a flag comprising a treat pocket and a treat delivery opening, wherein the flag is coupled to the body.
2. The pet toy of claim 1, wherein the flag further comprises a treat pocket; and
   a treat delivery opening.
3. The pet toy of claim 1, wherein the toy further comprises a treat coupled to the treat pocket.
4. The pet toy of claim 3, wherein the treat comprises one of a pet comestible, a rawhide chew, a plastic she, a rubber chew, a smaller toy, a squeaky toy, a pheromone-enhanced toy, a pet medication, a pet vitamin, and a pet nutritional supplement.
5. The pet toy of claim 3, wherein the treat is irremovably contained within the treat pocket.
6. The pet toy of claim 1, wherein the flag is inelastic.
7. The pet toy of The pet toy of claim 1, wherein the pet toy further comprises a second compartment bounded by the body and the first compartment; and a second stuffing contained within the second compartment.
8. The pet toy of claim 1, wherein the pet toy resembles a teddy bear, a bunny rabbit, a bone, a spherical ball, an ovoid ball, or a football.
9. A method of use of a pet toy containing a treat compartment comprising:
   removing a flag with a treat pocket from a first compartment of the pet toy;
   loading a treat into the treat pocket;
   replacing the flag into the first compartment; and
   providing the pet toy to a pet.
10. The method of claim 9, further comprising:
    discovering the flag in the first compartment by the pet;
    removing the flag from the first compartment by the pet; and
    discovering the treat within the treat pocket by the pet.
11. A pet toy comprising:
    a body;
    a body opening in the body;
    a first compartment coupled within the body, wherein the first compartment is accessed through the body opening;
    a second compartment, wherein the first compartment is surrounded by the second compartment;
    a flag comprising a treat pocket and a treat delivery opening, wherein the flag is coupled to the first compartment and forms a first stuffing within the first compartment; and
    a second stuffing contained within the second compartment.
12. The pet toy of claim 11, wherein the pet toy further comprises a treat coupled to the flag.
13. The pet toy of claim 12, wherein the treat further comprises a pet pheromone.
14. The pet toy of claim 11, wherein the flag is inelastic.
15. The pet toy of claim 11 wherein the flag further comprises:
    a treat pocket; and
    a treat, wherein the treat is irremovably contained within the treat pocket.
16. The pet toy of claim 11, wherein the pet toy resembles a teddy bear, a bunny rabbit, a bone, a spherical ball, an ovoid ball, or a football.
17. A pet toy comprising:
    a body;
    a body opening in the body;
    a flag, wherein the flag is coupled to the body; and
    wherein the pet toy further comprises a treat coupled to the flag.

* * * * *